United States Patent [19]

Ozaki et al.

[11] 4,113,039
[45] Sep. 12, 1978

[54] BODY WEIGHT MEASURING APPARATUS

[75] Inventors: Tsutomu Ozaki, Amagasaki; Setsuo Hijikata, Yao, both of Japan

[73] Assignee: Kubota, Ltd., Osaka, Japan

[21] Appl. No.: 712,952

[22] Filed: Aug. 9, 1976

[30] Foreign Application Priority Data

Aug. 11, 1975 [JP] Japan .................. 50-98202

[51] Int. Cl.$^2$ ........................... G01G 19/44
[52] U.S. Cl. ......................... 177/25; 177/45; 177/DIG. 6; 364/567
[58] Field of Search ............... 177/25, 45, 210 R, 245, 177/DIG. 6; 235/151.33; 364/567

[56] References Cited

U.S. PATENT DOCUMENTS

| | | | |
|---|---|---|---|
| 2,913,238 | 11/1959 | Tommervik | 177/25 |
| 3,655,003 | 4/1972 | Yamajima | 177/245 X |
| 3,853,191 | 12/1974 | Yamagiwa | 177/210 |
| 3,866,699 | 2/1975 | Soehnle | 177/245 X |
| 3,951,221 | 4/1976 | Rock | 177/25 X |
| 3,967,690 | 7/1976 | Northcutt | 177/25 |

Primary Examiner—Joseph W. Hartary
Attorney, Agent, or Firm—W. G. Fasse; W. W. Roberts

[57] ABSTRACT

A body weight measuring apparatus, comprising a scale mechanism adapted to be displaced in accordance with the body weight of a person on the scale mechanism, means for converting the displacement amount of said scale mechanism into an electrical pulse train the number of which pulses is associated with said displacement amount, a counter for counting the number of pulses of said pulse train to provide a data associated with said body weight by way of a count value, and a display for displaying said body weight in a digital manner, wherein various conditioning data, such as the height, sex, age, nationality and the like of a person being measured is set, a standard body weight is evaluated in accordance with the set conditioning data, said standard body weight and said measured body weight are compared to evaluate the difference body weight, which is displayed by means of said display, an upper limit and/or lower limit for defining a desirable standard range of body weight determinable by said conditioning data is evaluated with said standard body weight, and said standard range and the measured body weight are compared to determine whether said measured body weight is "normal weight", "overweight", or "underweight", which determination is displayed by individual lamps, if desired, said standard body weight being also displayed by said display.

22 Claims, 8 Drawing Figures

BODY WEIGHT MEASURING APPARATUS

BACKGROUND OF THE INVENTION

1. Field of the Invention

The present invention relates to a body weight measuring apparatus. More specifically, the present invention relates to an improvement in such a body weight measuring apparatus, wherein various conditioning data, such as the height, sex, and the like of a person to be measured is adapted to be included in advance, and determination is adapted to be made of the relativity of the measured body weight with the standard body weight to be determined in accordance with the said conditioning data, such as "overweight", "underweight", "normal weight" or the like to display the same.

2. Description of the Prior Art

A table of desirable body weight, or normal body weight for each of various heights for male and female Japanese nationals has been announced by the Japanese Ministry of Health and Welfare and the like, for example. Hence, any person can learn the normal body weight most likely to his own height. To that end, the person compares his own body weight measured with a body weight measuring apparatus with the standard body weight as determined by his own height, thereby to determine the relativity of his own body weight with the standard body weight for the purpose of controlling his own body weight.

In case where a body weight measuring apparatus is utilized for the above described purpose, i.e. for measuring a person's body weight for comparison of the same with the standard body weight, it is most preferred that such a body weight measuring apparatus is provided with a display means which is adapted to display selectively such a standard body weight to be determined by the height of a person to be measured.

A prior art apparatus of interest to the present invention comprises a body weight scale, wherein a graduated disc is mounted so as to be rotated as a function of the weight of a person thereon such that the body weight graduation formed on the graduated disc is pointed by a pointer formed on a transparent window, and wherein the height graduation is provided in place on the said graduated disc or on the transparent window along the circumferential direction of the graduated disc, while the top plate or the transparent window of the scale is provided with a height pointer for pointing a desired value of a height graduation so as to be rotatable through a manual operation and, in addition, the graduated disc is further provided with a region for indicating the range of a predetermined relativity of the measured weight with respect to the height pointed by the height pointer, such as "underweight", "normal weight", "overweight" and the like. According to this type of the body weight scale, when the body weight of a person is measured after the height pointer is in advance set to the height graduation corresponding to the person, the height pointer points to a region for indicating the relativity of the measured body weight with the standard body weight, with the result that it can be known whether his measured body weight is normal or not.

However, with the above described scale, it is extremely difficult to indicate the standard body weight with accuracy over a wide range of the body weight. More specifically, the relativity of the standard body weight with the height is not constant throughout various values of the height and hence the range of the standard body weight varies in accordance with the value of the height. Therefore, with the above described body weight scale, the value of the standard body weight becomes inaccurate, if the value of the measured body weight comes off a given range. In order to solve such shortcomings, the graduated disc may be provided with spiral indicating portions so that the range of the standard body weight is varied in accordance with the value of the height, wherein these indicating portions are preferably shown in different colors such that the green denotes the standard range, the red denotes the overweight range and the like. However, according to such an improved scale, the visible range of the graduated plate is so narrow that it is hardly legible. Even if such a problem had been solved by any other expedient, such a scale cannot provide a standard body weight to be determined in consideration of various conditions, such as sex, age, nationality and the like of a person to be measured as well as the above discussed condition of the height, inasmuch as such a scale can only provide a standard body weight as determined as a function of a single condition, i.e. the height. In addition, with the above described scale, determination of the relativity of the measured body weight with the standard body weight range is incomplete and inaccurate, inasmuch as such a standard body weight range as determined as a function of the height is merely indicated by a spiral region indicated by a specific color.

SUMMARY OF THE INVENTION

An object of the present invention is to provide a body weight measuring apparatus, wherein a standard body weight can be indicated in consideration of various conditions, such as height, sex, age, nationality and the like of a person being measured as preset in advance.

Another object of the present invention is to provide a body weight measuring apparatus, wherein a standard body weight and a standard body weight range are evaluated in consideration of various conditioning data, such as the height, sex, age, nationality and the like of a person being measured as preset in advance and the evaluated standard body weight range is compared with the measured body weight to accurately determine the relativity of the measured body weight with the evaluated standard body weight range, such as overweight, underweight, normal weight or the like.

A further object of the present invention is to provide a body weight measuring apparatus which is capable of displaying the difference between a measured body weight and a standard body weight evaluated in consideration of various conditioning data, such as the height, sex, age, nationality and the like of a person being measured as preset in advance.

Still a further object of the present invention is to provide a body weight measuring apparatus that can display in a digital manner a measured body weight or a standard body weight and a determination of the relativity of the measured body weight with the standard body weight evaluated in consideration of various conditioning data, such as height, sex, age, nationality and the like of a person being measured.

Briefly described, the present invention comprises a body weight measuring apparatus, comprising means for generating an electrical signal representative of the body weight of a person, and means for evaluating the body weight value based on said electrical signal, characterized in that the apparatus further comprises means for setting various conditioning data such as the height, sex, age, nationality and the like of a person being measured, means for evaluating based on these preset conditioning data a standard body weight of a person or a body weight value most likely to the set conditioning data of the person, means for evaluating a standard body weight range, including the upper and lower limit thereof, which is allowable or acceptable by way of the said standard body weight, means for evaluating the difference between the measured body weight and the evaluated standard body weight, and means for determining whether or not the measured body weight is within the evaluated standard body weight range, whereupon the measured body weight, if desired the standard body weight, the difference and/or determination of the relativity are displayed.

These objects and other objects, features, advantages and aspects of the present invention will become more apparent from the following detailed description of the present invention when taken in conjunction with the accompanying drawings.

DESCRIPTION OF THE PREFERRED EMBODIMENTS

Figure 1:
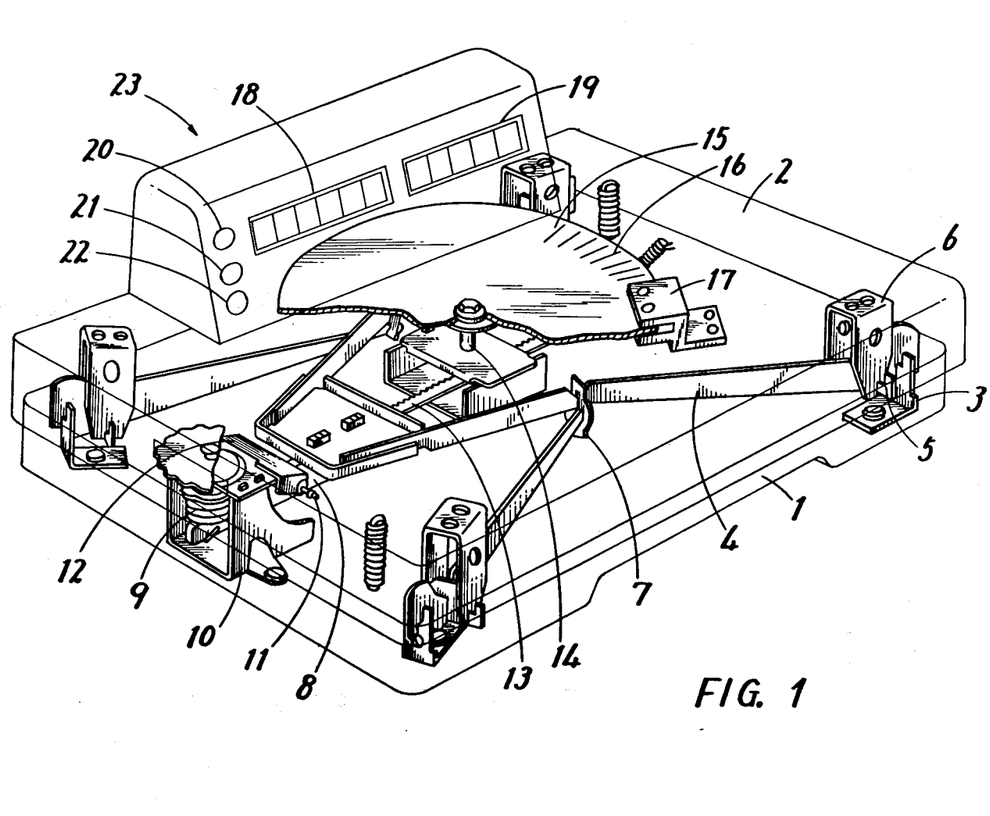
FIG. 1 is a perspective view showing an internal mechanical structure of a body weight measuring apparatus embodying the present invention.

FIG. 1 is a perspective view showing an internal mechanical structure of an embodiment of the body weight measuring apparatus in accordance with the present invention. The apparatus shown comprises a base plate 1 and a weighing base positioned thereon, said weighing base 2 being supported by four edge members 6 carried on levers 4 through intermediate edges 5, one of the respective ends of said levers 4 being pivotally supported on four fulcrum edges 3 disposed on the base plate 1. The action of the levers 4 is concentrated on a hanger 8 by rings 7 and applied to a main spring 9. The resilient deformation of the main spring 9 is transmitted to a link lever 12 pivotally supported by a frame 10 through link pins 11, said link lever 12 translating a toothed rack 13. The translational movement of the rack 13 rotates a graduated plate shaft 14 concentrically fixed to a pinion (not shown) meshing with said rack 13, so that a graduated plate 15 is rotated through a predetermined angle. The graduated plate 15 is formed of a plurality of slits 16 extending in the peripheral direction and equally spaced apart from each other. A photo detection assembly 17 is provided on the base plate 1 such that a light source and a photo detector (not shown) of the assembly are opposed to each other through the slit arranged portion of the graduated plate 15. Thus, the photo detection assembly 17 generates a pulse each time a slit 16 of the graduated plate 15 is detected as the plate 15 is rotated.

On the weighing base 2, a display assembly 23 is provided which comprises a body weight display 18, a difference weight display 19 and lamps 20, 21, and 22. Although the display assembly 23 will be described in detail subsequently in conjunction with the description of the operation, the above described two displays 18 and 19 each comprise a multidigit display of a segment arrangement type. The lamps 20, 21 and 22 have been allotted to indication of the relativity of the measured body weight with a given standard body weight, such as "overweight", "normal weight", and "underweight", respectively.

Figure 2:
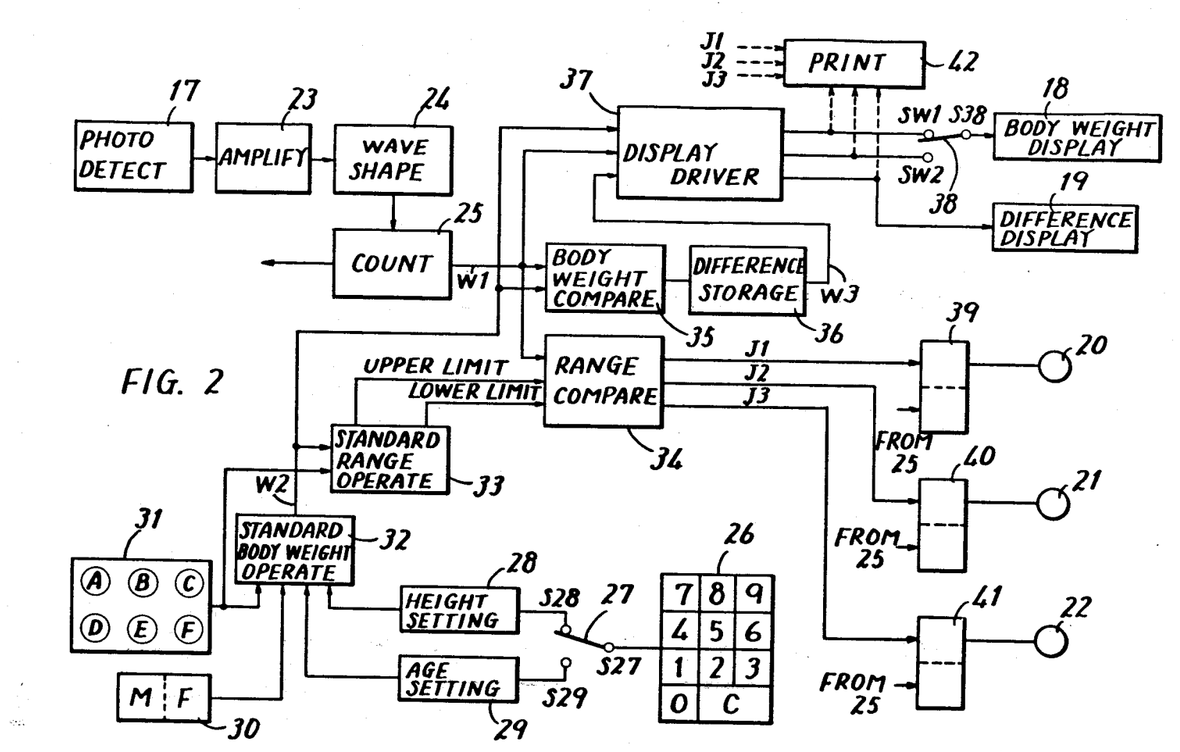
FIG. 2 is a block diagram of the inventive apparatus.

Referring to FIG. 2, the output from the photo detection assembly 17 is applied through an amplifier 23 and a wave shaping circuit 24 to a reversible counter 25. Although not shown, the embodiment may comprise a direction determining circuit responsive to the output pulses from the photo detection assembly 17 for determining the direction of the rotation of the graduated plate 15, i.e. an increase or decrease of the weight, whereupon the reversible counter 25 is controlled as in an up count mode or a down count mode, as usually employed in a common electronic scale. Therefore, it is appreciated that the count value in the counter 25 is representative of the measured body weight W1 of a person to be measured.

More specifically, with the embodiment shown, a pulse train is generated in accordance with the body weight of a person on the weighing base 2 and a counting operation is made either in the forward or rearward direction, whereby the measured body weight is evaluated in terms of the number of pulses. The counter 25 may be a pure binary counter or a binary coded decimal counter. In either case, it follows that the measured body weight is indicated in a pure binary code or in a binary coded decimal code. Alternatively, however, the graduated plate 15 may be provided with coded slits, in place of a succession of the slits 16, such that each position in the direction of the coded slits is represented by the code of the coded slits, in which case the output from the photo detection assembly 17 represents by itself the body weight of the person in the coded manner. By way of a further modification, in combination with an analog-digital converter, a so-called load cell may be employed that is responsive to the stress caused by the body weight of a person on the weighing base 2 to provide an electrical signal the magnitude of which is variable as a function of change of a resistance value caused by the stress. In effect, any type of electrical circuits may be used wherein an electrical signal is generated in accordance with the body weight of a person and is converted to a digital signal representative of the measured body weight.

Either on the weighing base 2 of the apparatus or separately from the apparatus, a key board 26 is provided in association with the apparatus for the purpose of inputting the numeral values of 0 through 9 through manual operation. The key board 26 is aimed to set the values of the height or age of a person to be measured.

The output from the key board 26 is applied through a mode selecting switch 27 to a height setting circuit 28 or an age setting circuit 29. Thus, turning of a contact S27 of the mode selecting switch 27 to a contact S28 makes the height setting circuit 28 be selected, so that the height of a person can be set by manual operation of the key board 26. On the other hand, turning of the switch contact S27 to a contact S29 makes the age setting circuit 29 be selected, whereby the age of a person can be set through manual operation of the key board 26. The data concerning the height as set obtainable from the height setting circuit 28 and the data concerning the age as set obtainable from the age setting circuit 29 are both applied to a standard body weight operating unit 32 by way of the conditioning data for evaluating the standard body weight associated with the set height and age.

In addition, on the weighing base 2 of the apparatus or separately from the apparatus, a sex setting circuit 30 for setting the conditioning data concerning the sex of the person being measured, i.e. male or female, and a nationality setting circuit 31 for setting the conditioning data concerning the nationality or the race of the person being measured are provided in association with the apparatus. The sex setting circuit 30 may comprise a 2-position switch, one position being allotted to the male and the other position being allotted to the female such that either sex can be set, and the set output is applied to the standard body weight operating unit 32 by way of a conditioning data. On the other hand, the nationality setting circuit 31 comprises six individual switches corresponding to six nations, A, B, C, D, E and F, so that depression of the corresponding switch enables setting of the conditioning data of the corresponding nation, A, B, C, D, E or F. Similarly, the set output from the nationality setting circuit 31 is also applied to the standard body weight operating unit 32 by way of a conditioning data for evaluating the standard body weight. Thus, the standard body weight operating unit 32 is adapted to evaluate the standard body weight W2 of a person being measured in consideration of the conditioning data, such as the height, age, sex, nationality and the like of the person being measured.

The standard body weight W2 as evaluated by the standard body weight operating unit 32 is applied to a standard body weight range operating unit 33. The standard body weight range operating unit 33 is adapted to evaluate the upper limit and the lower limit of the body weight defining the range of the body weight desirable or acceptable to the person being measured, based on the above described standard body weight W2. Thus, the standard body weight range is determined by the operating unit 33, which is utilized to determine the relativity of the measured body weight of the person with the standard body weight range, such as "overweight", "normal weight", "underweight" or the like in the embodiment shown. To that end, the upper limit value and the lower limit value of the range obtainable from the standard body weight range operating unit 33 as well as the measured body weight W1 obtainable from the counter 25 are applied to a range compare circuit 34 for the purpose of comparison. The range compare circuit 34 is adapted to make such determination as described above, thereby to provide an individual determination output J1, J2 or J3, corresponding to "overweight", "normal weight" or "underweight", respectively in the embodiment shown.

The determination output J1 representative of "overweight" is applied to a flip flop 39, the determination output J2 representative of "normal weight" is applied to a set input of a flip flop 40, and the determination output J3 representative of "underweight" is applied to a set input of a flip flop 41. The output from the flip flop 39 is applied to the said lamp 20 to energize the same, the output from the flip flop 40 is applied to the said lamp 21 to energize the same, and the output from the flip flop 41 is applied to the said lamp 22 to energize the same. These three flip flops 39, 40 and 41 are adapted to receive at the reset inputs thereof the zero signal or the minus signal representative of minus from the counter 25 indicating that the count value in the counter 25 is zero. Thus, if and when the range compare circuit 34 determines that the measured body weight of the person is overweight, the lamp 20 is lighted, if and when the measured body weight of the person is within the standard body weight range, the lamp 21 is lighted, and if and when the measured body weight of the person is underweight, the lamp 22 is lighted.

The measured body weight W1 obtainable from the counter 25 and the standard body weight W2 obtainable from the standard body weight operating unit 32 are applied to a body weight compare circuit 35, while these body weight values W1 and W2 are applied to a display driver 37 by way of a display information signal. The body weight compare circuit 35 is adapted to be responsive to the measured body weight value W1 and the standard body weight value W2 as inputted to evaluate the difference body weight W3, i.e. the difference of subtraction of the standard body weight from the measured body weight, which difference output W3 is then applied to a difference body weight storage 36. The difference body weight value W3 as stored in the storage 36 as well as the other body weight values W1 and W2 is applied to the display driver 37. The display driver 37 serves to display the measured body weight W1 or the standard body weight W2 in the body weight display 18 and to display the difference body weight W3 in the difference body weight display 19. A selective display of the measured body weight value W1 or the standard body weight value W2 is performed by means of a display selecting switch 38 provided in association with the display 23 in the FIG. 1 embodiment. More specifically, the contact S38 of the display selecting switch 38 is normally connected to the contact SW1 to display the measured body weight W1, but selective depression of the display selecting switch 38 causes the contact S38 to be connected to the contact SW2 tentatively, thereby to display the standard body weight W2. If desired, a printer 42 may be provided for the purpose of printing out various data, such as the measured body weight W1, the standard body weight W2, the difference body weight W3 and determination of the relativity, i.e. the alpha numeric characters representative of the output J1, J2 or J3.

Figure 3:
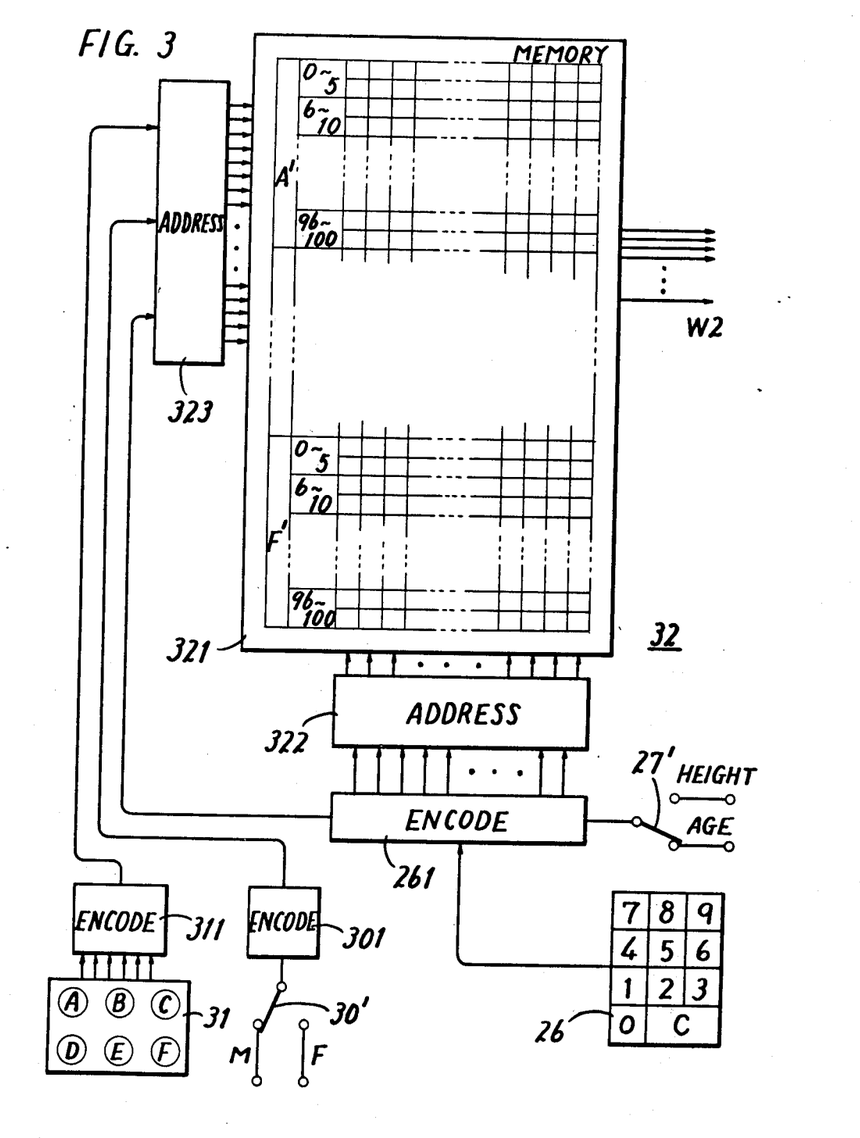
FIG. 3 is a block diagram of a preferred embodiment of a standard body weight operating unit in the FIG. 2 embodiment.

Referring to FIG. 3, an exemplary operating unit including the standard body weight operating unit 32 will be described. The height setting is enabled by means of a mode selecting switch 27'. Then the value of the height of the person being measured is inputted through manual operation of key board 26. More specifically, the key board 26 comprises ten numeral inputting keys corresponding to the numerals 0, 1, 2, . . . 9 such that depression of each key generates a coded signal of the depressed numeral key,, and the key depressed signal of two digits to four digits obtainable from the key board 26 when the value of the height is inputted is applied to an encoder 261. The encoder 261 is structured to be responsive to the key depressed signal from the key board 26 to generate a binary coded decimal code signal representative of the value of the height as inputted, which is then applied to an addressing circuit 322. Similarly, the key depressed signal of one digit or two digits representative of the age of the person is inputted to the encoder 261 through manual operation of the key board 26 and the switch 27'. Thus, the encoder 261 is also responsive to such key depressed signal from the key board 26 to generate a binary coded decimal code signal representative of the age of the person, which is then applied to the addressing circuit 323.

A memory 321 comprises a random access memory of a magnetic core type, an integrated circuit type, or the like, and comprises in the ordinate six major blocks A' through F' so as to correspond to the above described six nations A through F, each block comprising a multiple number of age regions. Each age region of the respective nations blocks is further divided into two sex regions allotted for a male region and a female region. Each of the male and female regions comprises in the abscissa many addresses corresponding to various values of the height, such that each address is preloaded with the standard body weight to be determinable based on the corresponding height value. That is, the memory 321 comprises in the ordinate various addresses allotted for the nation, age and sex and in the abscissa many addresses allotted for various values of the height, such that each location as determined by the respective addresses for the nation, age and sex and the respective address for the height is preloaded with the standard body weight as determinable by these conditioning data in accordance with the statistical data already made public and available.

On the other hand, a selecting switch 30' constituting the sex setting circuit 30 provides, upon selective turning of the switch, a sex signal representative of the male or female to an encoder 301. The encoder 301 is responsive to the inputted sex signal to provide a one-bit sex code signal, such as "1" for the male and "0" for the female, to an addressing circuit 323. On the other hand, the respective nationality selecting signal obtainable from the nationality setting circuit 31 is applied to an encoder 311. The encoder 311 is adapted to be responsive to the nationality selecting signal to provide a 3-bit nationality code signal, such as "000" for the nation A, "001" for the nation B and so on, to the addressing circuit 323.

In operation, the addresses of the ordinate in the memory 321 are first determined and selected by means of the addressing circuit 323. More specifically, the addressing circuit 323 is made to select the corresponding nationality block, age region and sex region in the memory 321. Thereafter, the address in the abscissa of the memory 321 is determined and selected by means of the addressing circuit 322. More specifically, the addressing circuit 322 is made to select the address corresponding to the height of the person in the memory 321. As a result, the standard body weight W2 with respect to the selected height as determined in consideration of the conditioning data such as the nation, age and sex based on the statistical data is selected and read out from the memory 321.

Figure 4:
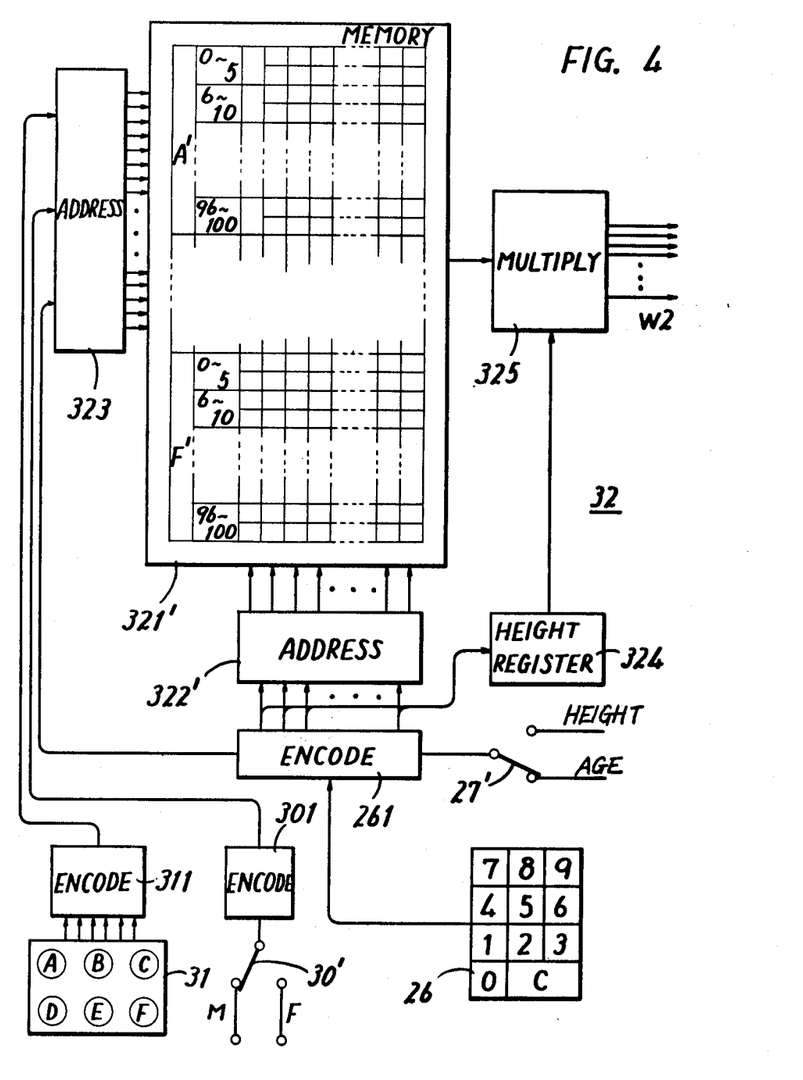
FIG. 4 is a block diagram of another preferred embodiment of a standard body weight operating unit in the FIG. 2 embodiment.

Referring to FIG. 4, another embodiment of the standard body weight operating unit will be described. Setting of the height and the age by the use of the key board 26, the setting of the sex by the use of the switch 30' and the setting of the nationality by the use of the nationality setting circuit 31 are effected in substantially the same manner as described in conjunction with the FIG. 3 embodiment.

Figure 5:
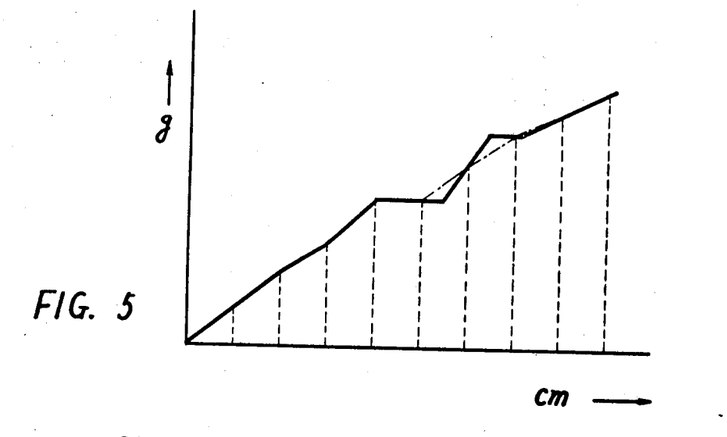
FIG. 5 is a graph showing a change of the standard body weight with respect to the height.

A memory 321' comprises, as described in conjunction with the FIG. 3 embodiment, in the ordinate nationality blocks A' through F', age regions and sex regions. Each sex region comprises in the abscissa many addresses corresponding to various height value regions, and each address is preloaded with the corresponding body weight coefficient determinable in accordance with the respective height value region, which coefficient is to be used for evaluation of the standard body weight as to be more fully described subsequently. In general, the standard body weight is not uniformly changed with respect to the height, as seen in FIG. 5, in most statistical data showing the relation between the standard body weight and the height. Thus, it is appreciated that the gradient or rate of change of the curve in the graph showing the relation between the standard body weight and the height is changeable depending upon the height. Therefore, according to the embodiment shown, the height region is selected for each 5 cm, for example, as shown in the abscissa of FIG. 5 and the rate of change within each height region is adapted to be preloaded in the corresponding address of the memory 321' as a coefficient (gram/cm).

An encoder 261' is adapted to be responsive to a value of the height as inputted to encode the same into an individual signal as regards which height region the inputted height pertains to, and the encoded individual height region code is applied to an addressing circuit 322'. At the same time, the value of the height represented by a binary coded decimal code signal is loaded in a height register 324. The addressing circuit 322' serves to select the corresponding address of the height in the memory 321' in the corresponding nationality block, age region and sex region as addressed by means of the addressing circuit 323. Accordingly, the standard body weight coefficient (gram/cm) with respect to the height of a person being measured is read out from the memory 321' and is applied to a multiplying circuit 325. The multiplying circuit 325 is also supplied with the height (cm) of the person being measured from the above described height register 324. Accordingly, the multiplying circuit 325 makes a multiplying operation of the readings of standard body weight coefficient (gram/cm) X the height (cm), thereby to provide the standard body weight W2 with respect to the said height.

The standard body weight W2 thus obtained is displayed by means of the body weight display 18 upon depression of the display selecting switch 38, and is applied to the standard body weight range operating unit 33 and the body weight compare circuit 35, as described previously.

Figure 6:
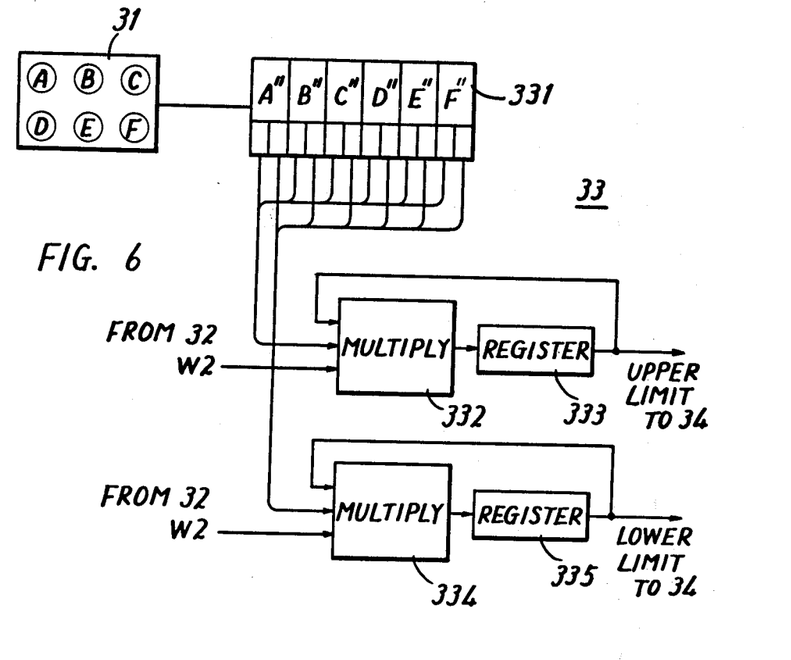
FIG. 6 is a block diagram of a preferred embodiment of a standard range operating unit in the FIG. 2 embodiment.

The standard body weight range operating unit 33 will be described in more detail with reference to FIG. 6. The standard body weight W2 evaluated as described above is applied to two multiplying circuits 332 and 334. The nationality selecting signal obtainable from the above described nationality setting circuit 31 is applied to a nationality classified body weight range coefficient memory 331 to select nationality classified addresses A" through F". The nationality classified body weight range coefficient memory 331 has been loaded in advance with the upper limit ratio and the lower limit ratio, such as +10% and −10% respectively, representative of the ratios of the upper limit and lower limit, respectively, of the body weight range desirable or acceptable to the standard body weight W2 determinable for the respective nations or races. Therefore, if and when the nationality of a person being measured is set by means of the nationality setting circuit 31, the upper limit ratio for the standard body weight applicable to the corresponding nationality is applied to the multiplying circuit 332 and the lower limit ratio for the standard body weight applicable to the corresponding nationality is applied to the multiplying circuit 334. Accordingly, the multiplying circuit 332 makes a multiplying operation of the standard body weight W2 X the upper limit ratio, while the multiplying circuit 334 makes a multiplying operation of the standard body weight W2 X the lower limit ratio. Thus, the upper limit of the standard body weight range is evaluated by the multiplying circuit 332, while the lower limit value of the standard body weight range is evaluated by the multiplying circuit 334. The said upper limit value is held in a recirculation manner by a register 333 and is also applied to the range compare circuit 34. On the other hand, the lower limit value is held in a recirculation manner by a register 335 and is also applied to the range compare circuit 34.

Figure 7:
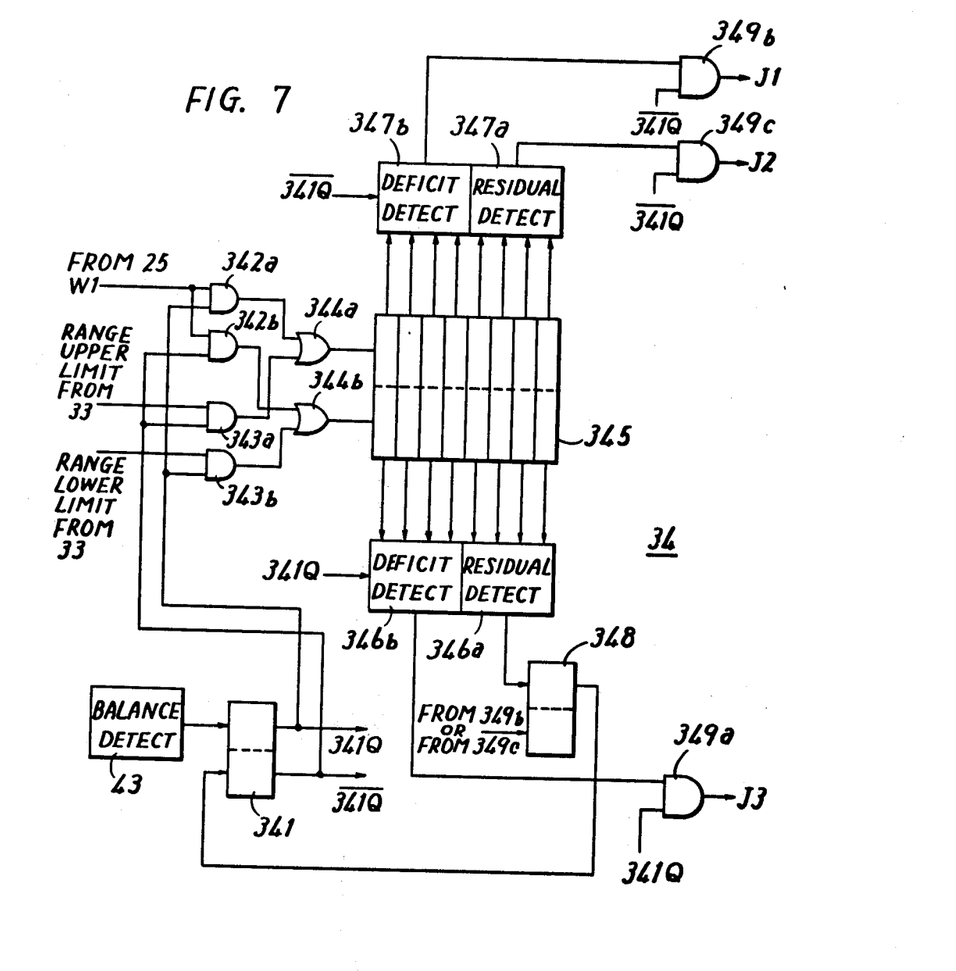
FIG. 7 is a block diagram of a preferred embodiment of a range determining unit in the FIG. 2 embodiment.

Referring to FIG. 7, the range compare circuit 34 will be described in more detail. In general, a body weight measuring apparatus of this type is provided with a balance detecting circuit 43 for detecting the graduated plate 15 shown in FIG. 1 having been in a stationary state, i.e. a balance state. Thus, the output from the balance detecting circuit 43 indicates that the apparatus has reached a balance state, which means that the body weight value obtainable at that time is a correctly measured body weight. The output from the balance detecting circuit 43 is applied to the set input of a flip flop 341 to set the same. The set output from the flip flop 341 serves as a command signal for instructing initiation of the body weight range comparison.

The body weight range compare circuit 34 is adapted to compare first of all the measured body weight W1 with the lower limit value obtainable from the standard body weight range operating unit 33. To that end, the set output 341Q from the said flip flop 341 is applied to AND gates 342a and 343b as one inputs thereto. Accoridngly, the measured body weight W1 obtainable from the counter 25 is applied through the AND gate 342a and OR gate 344a to a subtraction circuit 345 as a minuend. On the other hand, the lower limit of the range obtainable from the standard body weight range operating unit 33 is applied through the AND gate 343b and OR gate 344b to the subtraction circuit 345 as a subtrahend. The subtraction circuit 345 is adapted to subtract the subtrahend loaded in the lower half portion of the circuit 345 from the minuend loaded in the upper half portion of the circuit 345, thereby to make subtracting operation of the measured body weight W1 minus the lower limit value of the body weight range.

While the above described subtracting operation of the measured body weight W1 minus the lower limit value of the body weight range is effected, a residual defecting circuit 346a and a deficit detecting circuit 346b are enabled by the output 341Q from the said flip flop 341. The residual detecting circuit 346a and a residual detecting circuit 347a to be described subsequently are adapted to detect whether the difference as a result of subtraction by the subtraction circuit 345 is positive, i.e. a residual, or not. For example, some numerical value remains in the less significant four digit positions in the subtraction circuit 345, if and when the minuend is larger than the subtrahend, which means that the difference as a result of the subtraction is positive, i.e. a residual, whereby the output representative of a residual obtainable is provided. On the other hand, the deficit detecting circuit 346b and a deficit detecting circuit 347b to be described subsequently are adapted to detect whether the difference as a result of the subtraction by the subtraction circuit 345 is negative, i.e. a deficit, by detecting occurrence of the numeral "9" in the more significant four digit positions of the subtraction circuit 345. More specifically, if and when the subtrahend is larger than the minuend, there occurs a borrow from the more significant digit of the minuend, with the result that the numeral "9" occurs in at least any one of the more significant four digit positions as a result of subtraction. Therefore, the occurrence of the numeral "9" in the more significant four digit positions is detected for the purpose of detecting a deficit.

Now consider a case where the measured body weight W1 is smaller than the lower limit of the body weight range. In such a situation, a deficit occurs as a result of subtraction by the subtraction circuit 345, as described previously. Accordingly, an output is obtained from the deficit detecting circuit 346b which has been enabled by the output 341Q from the flip flop 341. Therefore, an output is obtained from the AND gate 349a which has also been enabled by the output 341Q from the flip flop 341. The output from the AND gate 349a thus obtained constitutes a determination output J3 indicating "underweight" and is applied to the set input of the flip flop 41 in FIG. 2. As a result, the lamp 22 is lighted, thereby to indicate that the person being measured is underweight, in such a case where the measured body weight is smaller than the lower limit of the body weight range.

Next consider a case where the measured body weight W1 is larger than the lower limit of the body weight range. In such a situation, the subtraction circuit 345 gives rise to a residual, as described previously. Accordingly, an output is obtained from the residual detecting circuit 346a and thus the flip flop 348 is set. The set output from the flip flop 348 is applied to the reset input to the flip flop 341, thereby to reset the same. In this case, the operation is followed by comparision of the measured body weight W1 with the upper limit of the body weight range. To that end, the reset output $\overline{341Q}$ from the flip flop 341 is applied to the AND gates 342b and 343a to enable the same. Accordingly, the measured body weight W1 obtainable from the counter 25 is applied through the AND 342b and the OR gate 344b to the subtraction circuit 345 as a subtrahend. On the other hand, the upper limit value of the body weight range obtainable from the standard body weight range operating unit 33 is applied through the AND gate 343a and the OR gate 344a to the subtraction circuit 345 as a minuend. Thus, the subtraction circuit 345 makes a subtracting operation of the upper limit value of the body weight range minus the measured body weight W1.

When the above described subtracting operation of the upper limit value of the body weight range minus the measured body weight W1 is effected, the residual detecting circuit 347a and the deficit detecting circuit 347b have been enabled by the output $\overline{341Q}$ from the flip flop 341. The residual detecting circuit 347a serves to detect whether a residual is provided in the less significant four digit positions of the subtracting circuit as a result of subtraction, while the deficit detecting circuit 347b serves to detect whether the numeral "9" representative of a deficit is provided in the more significant four digit positions of the subtraction circuit 345 as a result of subtraction.

Now consider a case where the measured body weight W1 is smaller than the upper limit of the body weight range. As described previously, the subtraction circuit 345 gives rise to a residual in such a situation. Therefore, an output is obtained from the residual detecting circuit 347 and thus an output is obtained from the AND gate 349c which has been enabled by the output $\overline{341Q}$ from the flip flop 341. The output from the AND gate 349c constitutes a determination output J2 indicating "normal weight", and is applied to the set input of the flip flop 40 in FIG. 2 to set the same. Accordingly, the lamp 21 is lighted, thereby to indicate that the person being measured is normal weight, if and when the measured body weight W1 is larger than the lower limit value of body weight range and the measured body weight W1 is smaller than the upper limit value of the body weight range.

Next consider a case where the measured body weight W1 is larger than the upper limit of the body weight range. In such a situation, the subtraction circuit 345 gives rise to a deficit, as described previously. Therefore, an output is obtained from the deficit detecting circuit 347b which has been enabled by the output $\overline{341Q}$ from the flip flop 341. Therefore, an output is obtained from the AND gate 349b which has been enabled by the output $\overline{341Q}$. The output from the AND gate 349b constitutes a determination output J1 indicating "overweight", and is applied to the set input of the flip flop 39 in FIG. 2 to set the same. Accordingly, the lamp 20 is lighted, thereby to indicate that the person being measured is overweight, in case where the measured body weight W1 is larger than the upper limit of the body weight range.

Thus, an individual determination output J1, J2 or J3 is obtained from the body weight range compare circuit 34 to cause the corresponding lamp 20, 21 or 22 to emit light, thereby to make a visual corresponding indication of "overweight", "normal weight" or "underweight".

Figure 8:
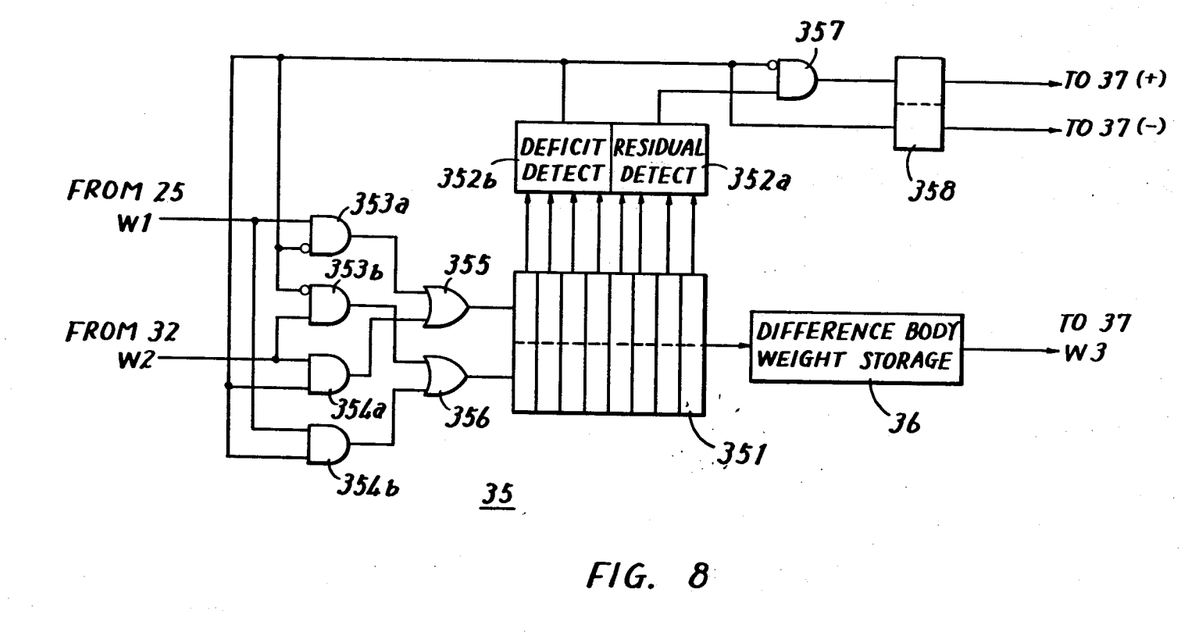
FIG. 8 is a block diagram of a preferred embodiment of a body weight compare unit in the FIG. 2 embodiment.

Referring to FIG. 8, the body weight compare circuit 35 will be described in more detail. In an initial condition, the body weight compare circuit 35 has been cleared by a zero detected signal or a minus detected signal from the counter 25, for example. Therefore, the contents in the subtraction circuit 351 are all "0" in such a situation, and accordingly no output is obtained from the deficit detecting circuit 352 which has been structured similarly to the deficit detecting circuits 346b and 347b in FIG. 7. Therefore, AND gates 353a and 353b are enabled. Accordingly, the measured body weight W1 obtainable from the counter 25 is applied through the AND gate 353a and the OR gate 355 to the subtraction circuit 351 as a minuend. On the other hand, the standard body weight W2 obtainable from the standard body weight operating unit 32 is applied through the AND gate 353b and the OR gate 356 to the subtraction circuit 351 as a subtrahend. It is pointed that the subtraction circuit 351 is structured such that subtraction is made of the numerical value in the lower half from the numerical value in the upper half. Thus, in such a situation, the subtracting circuit 351 makes a subtracting operation of the measured body weight W1 minus the standard body weight W2.

As similar to the FIG. 7 circuit, when the subtracting operation of the measured body weight W1 minus the standard body weight W2 is effected, the residual detecting circuit 352a which has been structured similarly to the residual detecting circuits 346a and 347a in FIG. 7 and the deficit detecting circuit 352b have been enabled by the balance detected signal obtainable from the balance detecting circuit 43 (FIG. 7).

Now consider a case where the measured body weight W1 is larger than the standard body weight W2. In such a situation, the subtraction circuit 351 gives rise to a residual. Accordingly, an output is obtained from the residual detecting circuit 352 and is applied to one input to the AND gate 357. The AND gate 357 is supplied with an inverted output from the deficit detecting circuit 352b at the other input thereto. Therefore, an output is obtained from the AND gate 357 and is applied to the set input to the flip flop 358 to set the same. As a result, the set output is obtained from the flip flop 358, which indicates that the difference body weight W3 (W1 − W2) is positive, which output is applied to the display driver 37. The residual (W1 − W2) in the subtraction circuit 351 is loaded as the difference body weight W3 in the difference body weight storage 36, and is also applied to the display driver 37.

Next consider a case where the measured body weight W1 is smaller than the standard body weight W2. As described previously, the measured body weight W1 has been applied to the subtraction circuit 351 as a minuend, while the standard body weight W2 has been applied to the subtraction circuit 351 as a subtrahend. Therefore, the subtraction circuit 351 has given rise to a deficit. As a result, an output is obtained from the deficit detecting circuit 352b, whereby the AND gate 357 is disabled and the flip flop 358 is reset. The reset output from the flip flop 358 constitutes an output indicating that the difference body weight W3 (W1 − W2) is negative, and is applied to the display driver 37.

When the output is obtained from the deficit detecting circuit 352b, as described above, the AND gates 354a and 354b are enabled accordingly. As a result, the measured body weight W1 obtainable from the counter 25 is applied through the AND gate 354b and the OR gate 356 to the subtraction circuit 351 as a subtrahend. On the other hand, the standard body weight W2 obtainable from the standard body weight operating unit 32 is applied through the AND gate 354a and the OR gate 355 to the subtraction circuit 351 as a minuend. As a result, the subtraction circuit 351 gives rise to a residual. The residual (W2 − W1) is loaded as the difference body weight W3 in the difference body weight storage 36 and is also applied to the display driver 37.

As a result, the absolute difference value (the difference body weight W3) of the subtraction of the measured body weight W1 minus the standard body weight W2 and the sign of "+" or "−" are displayed by the difference body weight display 19. If and when the measured body weight W1 is equal to the standard body weight W2, of course the display 19 makes indication of "zero".

It is pointed out that various operating units described in the foregoing embodiment may be implemented by a micro processor comprising a one chip integrated circuit and the like, but alternatively may be implemented by a combination of a micro processor and a programmable read only memory.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A body weight measuring apparatus, comprising sensing means responsive to the body weight of a person being weighed on said apparatus to provide a measured displacement value representing the actual body weight, signal generating means operatively connected to said sensing means for generating an electrical signal representative of said actual body weight, setting means for providing fixed conditioning data including at least a reference signal value associated with the height of said person being weighed, signal evaluating means operatively connected to said setting means for determining a standard range of body weight values correlated to said conditioning data, means operatively connected to said signal generating means and to said signal evaluating means for determining the relativity of said measured actual body weight value relative to said standard body weight range values, and display means responsive to an output from said relativity determining means for displaying the result of said determining and correlating, wherein said signal evaluating means for determining a standard range of body weight values comprise first means responsive to said fixed conditioning data to evaluate a standard body weight value out of said standard range of body weight values and second means responsive to said first means and thus to said standard body weight value for evaluating an extremity value of said standard body weight range, said first means comprise memory means for storing a list of a plurality of standard body weight values in the form of electrical signals as classified in accordance with said conditioning data, said apparatus further comprising means responsive to said setting means and operatively connected to said memory means for addressing said list of standard body weight values for selectively reading out the corresponding standard body weight value to provide a respective electrical signal.

2. The apparatus of claim 1, wherein said signal generating means comprise pulse train generating means, whereby the number of pulses in a pulse train is associated with said measured displacement value, and means coupled to said pulse train generating means for counting the number of pulses in a pulse train.

3. The apparatus of claim 1, wherein said signal generating means comprise machine readable coded means provided on said sensing means for representing said displacement value in a coded manner, and means operatively coupled to said machine readable coded means for machine reading said coded means for generating said electrical signal value representing the actual body weight in a coded manner.

4. The apparatus of claim 1, wherein said setting means comprise means for entry of a numerical value representing said conditioning data.

5. The apparatus of claim 1, wherein said setting means further comprise data setting means for taking into account the sex of a person being weighed.

6. The apparatus of claim 5, wherein said data setting means comprise a two-position switch.

7. The apparatus of claim 1, wherein said setting means comprise data setting means for taking into account the age of a person being weighed.

8. The apparatus of claim 1, wherein said setting means comprise data setting means for taking into account the body build of a person being measured.

9. The apparatus of claim 1, wherein said memory means has stored therein as part of said standard body weight values a data value representative of the body weight value of the person being weighed.

10. The apparatus of claim 1, wherein said standard body weight values comprise a height coefficient for evaluating a standard body weight value with reference to the respective height, and wherein said signal evaluating means comprise means responsive to said height coefficient read out from said memory means, said signal evaluating means being further responsive to said setting means for taking into account said signal value associated with the height of the person being weighted when evaluating said standard body weight value.

11. The apparatus of claim 1, wherein said second means for evaluating an extremity value comprise multiplier means for evaluating said extremity value through multiplication of said standard body weight value by a predetermined ratio.

12. The apparatus of claim 1, comprising further display means for displaying said measured actual body weight value.

13. The apparatus of claim 12, wherein said further display means for displaying the measured actual body weight value comprises means for displaying the value in a digital manner.

14. The apparatus of claim 1, wherein said display means comprise display elements for displaying a standard body weight value.

15. The apparatus of claim 14, wherein said display elements comprises digital display elements.

16. The apparatus of claim 1, further comprising selector circuit means operatively interconnecting said signal generating means and said signl evaluating means to said display means for selectively supplying said measured actual body weight value or a standard body weight value to said display means.

17. The apparatus of caim 16, wherein said selector circuit means are adapted to normally provide said measured actual body weight value to said display means and, upon selection, to provide said standard body weight value to said display means.

18. The apparatus of claim 1, further comprising difference circuit means operatively connected to said signal generating means and to said signal evaluating means for evaluating the difference between the signal representing said measured actual body weight and a signal representing a standard body weight, said difference circuit means being connected to said display means for displaying a difference in body weight value.

19. The apparatus of claim 18, wherein said display means comprise means for digitally displaying the difference value.

20. The apparatus of claim 1, wherein said display means comprise light emitting means and on/off switch means operatively arranged between said light emitting means and said determining means, said switch means being controllable in response to said output from said relativity determining means.

21. The apparatus of claim 20, wherein said light emitting means comprise a light emitting diode.

22. The apparatus of claim 1, wherein said signal generating means comprise analog means responsive to the measured displacement value produced by said sensing means for generating said electrical signal representative of said actual body weight as an analog signal and analog to digital converting means coupled to said analog means for converting said analog signal to a corresponding digital signal.

* * * * *

UNITED STATES PATENT OFFICE
CERTIFICATE OF CORRECTION

Patent No. 4,113,039　　　　　　　　Dated September 12, 1978

Inventor(s) Tsutomu Osaki et al

It is certified that error appears in the above-identified patent and that said Letters Patent are hereby corrected as shown below:

In Claim 10, line 9, replace "weighted" by --weighed--.

In Claim 16, line 3, replace "signl" by --signal--.

In Claim 17, line 1, replace "caim" by --claim--.

Signed and Sealed this

Fourteenth Day of November 1978

[SEAL]

Attest:

RUTH C. MASON
Attesting Officer

DONALD W. BANNER
Commissioner of Patents and Trademarks